Sept. 26, 1967 L. H. WALKER 3,344,335

CIRCUIT TO LIMIT DELAY IN SWITCHING AN INVERTER

Filed Dec. 14, 1964

INVENTOR.
LOREN H. WALKER
BY James J. Williams
HIS ATTORNEY

United States Patent Office 3,344,335

Patented Sept. 26, 1967

3,344,335

CIRCUIT TO LIMIT DELAY IN SWITCHING AN INVERTER

Loren H. Walker, Waynesboro, Va., assignor to General Electric Company, a corporation of New York Filed Dec. 14, 1964, Ser. No. 417,998
4 Claims. (Cl. 321—11)

Figure 1:
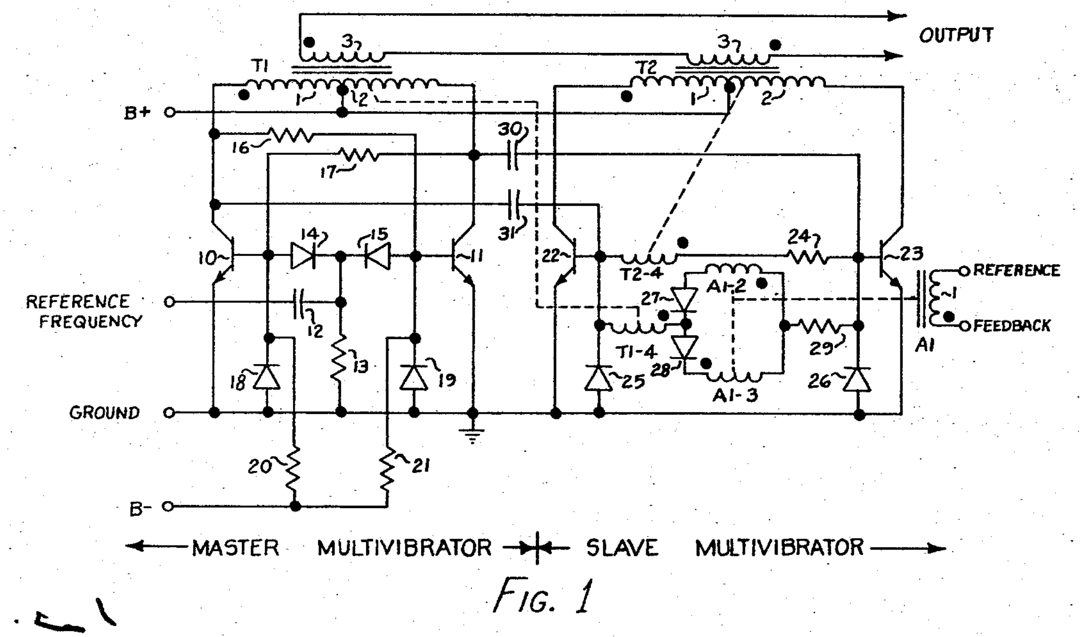

The invention relates to a circuit to limit the delay in switching an inverter, and particularly to such a circuit for inverters using master and slave multivibrators.

Static inverters are used to change direct current to alternating current. One type of static inverter uses a master multivibrator which switches at a predetermined rate and a slave multivibrator which is coupled to and switched by the master multivibrator at the same rate but at a later time. The time at which the slave multivibrator is switched determines the time duration of each square wave produced by the inverter. If the slave multivibrator is switched relatively early, the square wave duration is relatively small; and if the slave multivibrator is switched relatively late, the square wave duration is relatively large. The time duration of the square waves so produced determines the voltage amplitude of the output alternating current. When a relatively high amplitude of alternating current is desired or demanded, the time of switching the slave multivibrator is delayed to produce the greatest possible square wave time duration. However, it is essential that this time not be delayed beyond 180° or a half cycle of the operating frequency. If the time is delayed beyond 180° or a half cycle, the inverter will malfunction. The malfunction consists of loss of control of the frequency of the slave multivibrator, and is caused by the nature of the circuit causing the delay. This delay circuit serves to inhibit the passage of each half cycle of a square wave timing signal for a certain time. Thus a delay of 180° or more simply inhibits the entire square wave signal so that the slave multivibrator receives no timing signals and its frequency will be uncontrolled.

If the circuit causing the delay were a true delay circuit whose output at any time $t$ is a duplicate of the input at a previous time $t—t_d$, then the delay would still have to be limited to 180 electrical degrees. In this case with delays greater than 180°, the slave multivibrator frequency would be controlled, but the inverter output pulse width would be reduced, rather than increased for delays greater than 180°. This reversal of sense would cause instability of the regulating loop. Thus with either an inhibiting type delay circuit or a true delay circuit, some means of limiting the delay to 180° is needed.

Accordingly, an object of the invention is to provide a circuit which limits the delay in switching of an inverter.

Another object of the invention is to provide a circuit for an inverter that uses a master and slave multivibrator, and that insures that the slave multivibrator is switched no later than 180° or a half cycle, relative to the output frequency, after each switching of the master multivibrator.

Briefly, these and other objects are achieved in accordance with the invention by a circuit that capacitively couples the master multivibrator to the slave multivibrator in addition to the usal magnetic coupling between the master multivibrator and the slave multivibrator. The capacitive coupling is so arranged that each time the master multivibrator switches, the slave multivibrator must also switch in the proper manner. If the slave multivibrator has switched at an earlier time, then the capacitive coupling has no effect, and normal switching continues.

Figure 2:
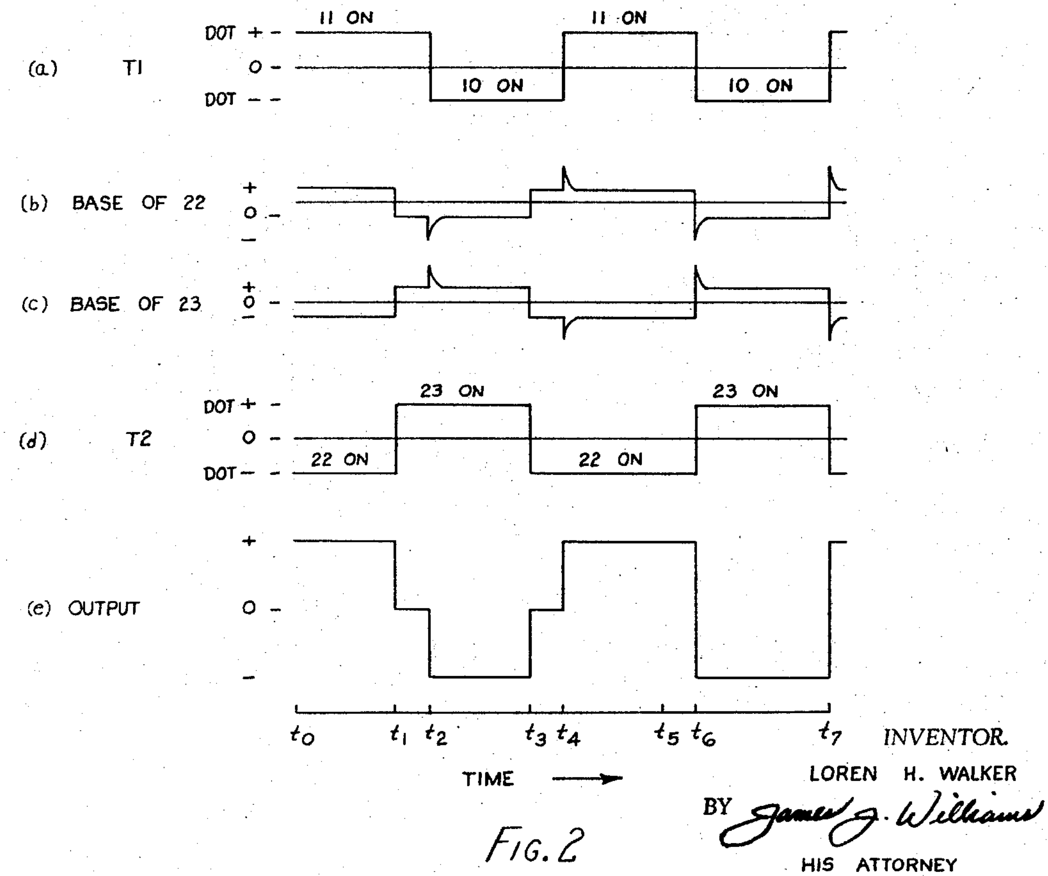

The invention is particularly pointed out in the claims. The invention may be better understood when the following description is considered in connection with the accompanying drawing in which:

FIGURE 1 shows a diagram of a circuit to limit the delay in switching an inverter in accordance with the invention; and FIGURE 2 shows waveforms for explaining the operation of the circuit in FIGURE 1.

The inverter shown in FIGURE 1 comprises a master multivibrator and a slave multivibrator which are known in the art. In FIGURE 1, there are two transformers T1, T2 which have windings indicated by a subsequent hyphen and number. Also in FIGURE 1, there is a magnetic amplifier A1 which has windings indicated by a subsequent hyphen and number. The windings which are coupled together are so indicated by dashed lines. Thus, the transformer T1 comprises four windings, the first, second, and third windings being in the master multivibrator and the fourth winding being in the slave multivibrator. Each of the windings in FIGURE 1 is provided with the conventional dot polarity. In accordance with this invention, a voltage polarity applied to the dotted end of a given winding causes the same polarity to appear at all dotted ends of all windings associated with that given winding.

In FIGURE 1, it has been assumed that the inverter produces 400 cycle alternating current from direct current supplied between a B+ terminal and a ground bus. The master multivibrator is supplied with a reference frequency which, for the assumed 400 cycles, may be negative-going pulses at an 800 cycle rate. These pulses are applied through a capacitor 12 and through diode rectifiers 14, 15 to the respective bases of NPN type transistors 10, 11. The transistors 10, 11 are connected in conventional bistable multivibrator fashion with resistors 16, 17 intercoupling their bases and collectors. The collectors of the transistor 10, 11 are respectively coupled to opposite ends of the windings T1–1, T1–2, and these windings T1–1, T1–2 are connected together and connected to the B+ terminal at their point of connection. The bases of the transistors 10, 11 are respectively coupled through diode rectifiers 18, 19 to the ground bus, and are also respectively coupled through resistors 20, 21 to a source of direct current potential B— that is negative with respect to the ground bus. A resistor 13 is coupled between the capacitor 12 and the ground bus. The emitters of the transistors 10, 11 are coupled directly to the ground bus. The master multivibrator is arranged so that when a negative-going pulse is applied, the transistor that is conducting is cut off and the current flow from the B+ terminal through the associated winding T1–1 or T1–2 causes the collector voltage of the conducting transistor to increase. This increased voltage is coupled through one of the resistors 16, 17 to cause the other transistor to be turned on.

The slave multivibrator also comprises two NPN type transistors 22, 23 which have their collectors coupled to opposite ends of the windings T2–1, T2–2. These windings T2–1, T2–2 are connected together and connected to the B+ terminal at their point of connection. The bases of the transistors 22, 23 are coupled together through a winding T2–4 and a resistor 24, and also through a winding T1–4, the parallel circuit comprising diode rectifiers 27, 28 and windings A1–2, A1–3, and a resistor 29. The slave multivibrator is switched from one condition with one transistor conducting to the other condition with the other transistor conducting by the winding T1–4 which is coupled to the transformer T1 in the master multivibrator. For example, if the transistor 11 in the master multivibrator is conducting, current is flowing from the dotted end to the undotted end of the winding T12. The dotted end of the winding T1–4 is therefore positive and this causes current to flow from this dotted end through the diode rectifier 28, the winding A1–3, the resistor 29, the base-emitter path of the transistor 23, and the diode rectifier 25 back to the undotted end of the winding T1–4.

This current is, at first, limited to a relatively low exciting current because of the previously reset condition of the magnetic amplifier A1. The exciting current continues to flow as long as the magnetic amplifier A1 is reset. But after some volt-second delay, the amplifier A1 becomes saturated in the set condition, and sufficient current may then flow around the path described to cause the transistor 23 to conduct. When the transistor 23 conducts, current flows from the dottend end toward the undotted end of the winding T2–2, and this provides regenerative or reinforcing action through the winding T2–4. Thus, the transistor 23 is quickly turned on and the transistor 22 is quickly turned off. When another negative-going pulse is applied to the master multivibrator to turn the transistor 11 off and the transistor 10 on, the transformer T1 reverses and current flows from the undotted ends toward the dotted ends of the windings of the transformer T1. Subsequently, the transistor 22 is turned on by a current which flows from the undotted end of the winding T1–4 through the base-emitter path of the transistor 22, the diode rectifier 26, the resistor 29, the winding A1–2, and the diode rectifier 27 back to the dotted end of the winding T1–4. This also turns the transistor 23 off.

An output from the master and slave multivibrators may be derived through the windings T1–3, T2–3 as shown. These windings T1–3, T2–3 add the voltage present in their respective transformers T1, T2 so that the output has an amplitude which, after being filtered, is proportional to the pulse width or duration supplied by the master and slave multivibrators. This pulse width is determined by the degree of reset in the magnetic amplifier A1. Typically, and as shown, the magnetic amplifier A1 is reset by an amount determined by the relative magnitudes of a reference voltage and a feedback voltage which are applied to opposite ends of the amplifier winding A1–1. As the feedback voltage (which may be indicative of the inverter output voltage) approaches the reference voltage in magnitude, the amplifier A1 is reset less. The inverter produces a lower output voltage amplitude for this condition. As the feedback voltage becomes less than the reference voltage, the inverter produces a higher output voltage amplitude.

The part of FIGURE 1 described thus far is known in the art. In accordance with the invention to limit delay in switching, two capacitors 30, 31 are provided between the master and slave multivibrators. The capacitor 30 is coupled between the undotted end of winding T1–2 and the base of the transistor 23, and the capacitor 31 is coupled between the dotted end of the winding T1–1 and the base of the transistor 22. These capacitors 30, 31 are coupled between the ends of the windings T1–1, T1–2 and the transistors 22, 23 in the slave multivibrator so that if, following each switching of the master multivibrator, the slave multivibrator does not normally switch, then the slave multivibrator will be switched 180° after switching of the master multivibrator. However, if the slave multivibrator does switch normally, then the capacitors 30, 31 have no effect.

The operation of the circuit of FIGURE 1, particularly the delay limit circuit of the invention, will be explained in connection with the waveforms shown in FIGURE 2. These waveforms show various voltages in the circuit plotted against a common time axis. The waveforms in FIGURES 2*a* and 2*d* show when the dotted ends of the windings of the transformers T1, T2 are respectively positive and negative. Initially, it has been assumed that the transistors 11, 22 are conducting at the time $t_0$. The dotted ends of the windings of the transformer T1 are positive and the dotted ends of the windings of the transformer T2 are negative. The output windings T1–3, T2–3 add to produce the output shown in FIGURE 2*e*. With the dotted end of the winding T1–4 in the slave multivibrator positive, exciting current flows from the dottend end of the winding T1–4 through the rectifier 28, the winding A1–3, the resistor 29, the base-emitter path of the transistor 23, and the diode rectifier 25 back to the undotted end of the winding T1–4. At a time $t_1$, this time being dependent on the degree to which the magnetic amplifier A1 has been reset, this current will saturate the magnetic amplifier A1 in the set direction. When the magnetic amplifier A1 is so saturated, sufficient current flows to cause the transistor 23 to conduct. Thus, as shown in FIGURE 2*d* at the time $t_1$, the transformer T2 reverses, the transistor 22 is turned off, tand the transistor 23 is turned on. The winding T2–4 causes the base voltage of the transistor 22 to change from a positive value to a negative value, and the base voltage of the transistor 23 to change from a negative value to a positive value. Thus, at the time $t_1$, the transistor 11 is turned on and transistor 23 is turned on. The dotted ends of all windings of both transformers T1, T2 are positive so that the voltages in the output windings T1–3, T2–3 oppose each other and the output falls to zero as shown in FIGURE 2*e* at the time $t_1$.

The operation described thus far is normal, and produces an output which is proper for the relative magnitudes of the reference and feedback signals. At the time $t_2$, the master multivibrator switches again, so that the dotted ends of the windings of transformer T1 become negative atnd the undotted ends of the windings of the transformer T1 become positive. When this occurs, the capacitor 31 supplies or couples a negative pulse to the base of the transistor 22 and the capacitor 30 supplies or couples a positive pulse to the base of the transistor 23. If the transistors 22, 23 had not switched at the time $t_1$, these pulses (shown in FIGURES 2*b* and 2*c* at the time $t_2$) would cause the desired switching to take place. However, since the transistor 23 is already turned on, the positive pulse at its base has no effect, and since the transistor 22 is already turned off, the negative pulse at its base likewise has no effect. Also at the time $t_2$, an output is produced.

After the time $t_2$, the magnetic amplifier A1 again begins to become saturated in the set direction. With the transistor T10 turned on, the dotted ends of the windings of transformer T1 are negative. Exciting current then flows from the undotted end of the winding T1–4 through the base-emitter path of the transistor 22, the diode rectifier 26, the resistor 29, the winding A1–2, and the diode rectifier 27 back to the dotted end of the winding T1–4. When, at the time $t_3$, the magnetic amplifier A1 becomes saturated in the set direction, the slave multivibrator switches and transistor 23 is turned off and the transistor 22 is turned on, as shown in FIGURE 2*d*. No output is produced at this time $t_3$. At the time $t_4$, the master multivibrator switches, and an output is produced. In addition, the transformer T1 switches and supplies a positive pulse to the base of transistor 22 and a negative pulse to the base of transistor 23 through the capacitors 31, 30 respectively. However, since the transistor 23 has already been properly turned off and the transistor 22 has already been properly turned on at the time $t_3$, these pulses have no effect.

It has been assumed that sometime after the time $t_4$ but before the normal time $t_5$, there is a signal applied to the winding A1–1 of the magnetic amplifier A1 which provides excess reset to the magnetic amplifier A1. This signal might be due to the application of a heavy load on the inverter output that calls for full inverter output amplitude. The magnetic amplifier A1, when heavily reset, has a sufficient volt-second capacity that it does not reach a set condition in a complete half cycle of voltage from the winding T1–4. Thus only exciting current can flow until the time $t_6$ when the positive signal on the dotted end of winding T1–4 is removed. If the magnetic amplifier A1 is able to sustain a full cycle of positive voltage without saturating in the set direction, then, with the same amount of reset, it will likewise be able to sustain a full cycle of negative voltage, so that further switching of the slave multivibrator would not take place in the absence of the invention. This could be very harmful, and would, among other things, provide direct current through the windings of the transformer T2 and eventually overload this transformer, or cause loss of synchronization. However, because of the capacitive coupling provided by the invention, when the master multivibrator switches at the time $t_6$, a negative pulse is supplied by the capacitor 31 to the base of the transistor 22 and a positive pulse is applied by the capacitor 30 to the base of the transistor 23. The effect of these pulses is to switch the slave multivibrator so that the transistor 22 is turned off and the transistor 23 is turned on. This takes place at the time $t_6$, which is at 180° of the output cycle. The regenerative drive from the transformer winding T1–4 sustains the slave multivibrator in the new condition following the switching by the pulses from the capacitors 30, 31. Thus, the slave multivibrator continues to switch each 180° Under these conditions, the inverter produces maximum output as shown in FIGURE 2*e*, and maintains proper frequency and synchronization.

At the time $t_7$, when the master multivibrator switches again, the capacitors 30, 31 cause the transistors 23, 22 to switch and thus cause the slave multivibrator to switch also.

It will thus be seen that the delay in switching slave multivibrator is limited to a half cycle or 180° of the switching frequency. This permits the normal delay provided by the magnetic amplifier to be designed without strict manufacturing tolerances, and without the necessity of taps. And, since the inverter can be safely operated over the full range of 180°, the inverter may produce the maximum output so as to provide a wider control range and utilize the circuit elements to their full capacity.

Various modifications of the invention will occur to persons skilled in the art. Therefore, while the invention has been described with reference to a particular embodiment, it is to be understood that modifications may be made without departing from the spirit of the invention or from the scope of the claims.

What I claim as new and desire to secure by Letters Patent of the United States is:

1. In an inverter having a master multivibrator that switches and energizes a first output transformer in alternate and opposite directions at a predetermined rate and having a slave multivibrator that switches and energizes a second output transformer in alternate and opposite directions at said predetermined rate, said slave multivibrator being coupled to said master multivibrator by a magnetic coupling and being switched through said magnetic coupling in response to said master multivibrator switching, the time between said master multivibrator switching and said slave multivibrator switching being determined by said magnetic coupling, the improvement comprising two capacitors coupled between said first output transformer and said slave multivibrator to provide respective and additional switching signals to said slave multivibrator that tend to switch said slave multivibrator if said slave multivibrator has previously failed to switch through said magnetic coupling.

2. An improved inverter comprising a master multivibrator having first and second current control devices and an output transformer regeneratively coupled to produce a square wave that switches from one value to another value at a predetermined rate; a slave multivibrator having first and second current control devices and an output transformer regeneratively coupled to produce a square wave that switches from one value to another value; a magnetic coupling circuit coupled between said master multivibrator and said slave multivibrator so that said slave multivibrator square wave is switched in response to said master multivibrator square wave switching and at a time determined by said magnetic coupling characteristic; and capacitors respectively coupled between said master multivibrator and said slave multivibrator so that said slave multivibrator square wave is switched in response to said master multivibrator switching if said slave multivibrator square wave has failed to switch through said magnetic coupling.

3. An improved inverter comprising a master multivibrator having first and second current control devices and an output transformer coupled to said devices to provide a square wave that switches from one value to another value at a predetermined rate; a slave multivibrator having first and second current control devices and an output transformer coupled to said first and second devices of said slave multivibrator to produce a square wave that switches from one value to another value; a magnetic coupling circuit coupled between said master multivibrator output transformer and said first and second devices of said slave multivibrator so that said slave multivibrator square wave switches in response to said master multivibrator square wave switching and at a time determined by the volt-second characteristics of said magnetic coupling; and first and second capacitors respectively coupled between said master multivibrator output transformer and said first and second devices of said slave multivibrator so that said slave multivibrator square wave switches in response to said master multivibrator square wave switching if said slave multivibrator square wave failed to switch through said magnetic coupling.

4. An improved inverter comprising a master multivibrator having an output transformer and first and second current control devices each having main path electrodes and a control electrode; means coupling said current control devices and said output transformer together to produce a square wave that switches between levels at a predetermined rate; a slave multivibrator having an output transformer and first and second current control devices each having main path electrodes and a control electrode; means coupling said first and second slave current control devices and said slave output transformer together to produce a square wave that switches between predetermined levels when said slave multivibrator is switched; a magnetic coupling circuit coupled to said master output transformer and to said control electrodes of said first and second slave current control devices so that said slave multivibrator is switched in response to the switching of said master multivibrator square wave and at a time determined by the volt-second characteristic of said magnetic coupling circuit; a first capacitor coupled between one point on said master output transformer and the control electrode of one of said slave current control devices; and a second capacitor coupled between another point on said master output transformer and the control electrode of the other of said slave current control devices.

References Cited

UNITED STATES PATENTS

| | | | |
|---|---|---|---|
| 3,002,142 | 9/1961 | Jensen | 321—9 |
| 3,026,484 | 3/1962 | Bennett et al. | 331—107 |
| 3,031,629 | 4/1962 | Kadri. | |
| 3,205,424 | 9/1965 | Bates. | |
| 3,248,639 | 4/1966 | Wellford. | |

FOREIGN PATENTS

| | | |
|---|---|---|
| 940,322 | 10/1963 | Great Britain. |

JOHN F. COUCH, *Primary Examiner.*

WM. SHOOP, *Assistant Examiner.*